March 17, 1936.   R. L. PFLIEGER   2,034,117
FOOD DISHER
Filed March 20, 1935
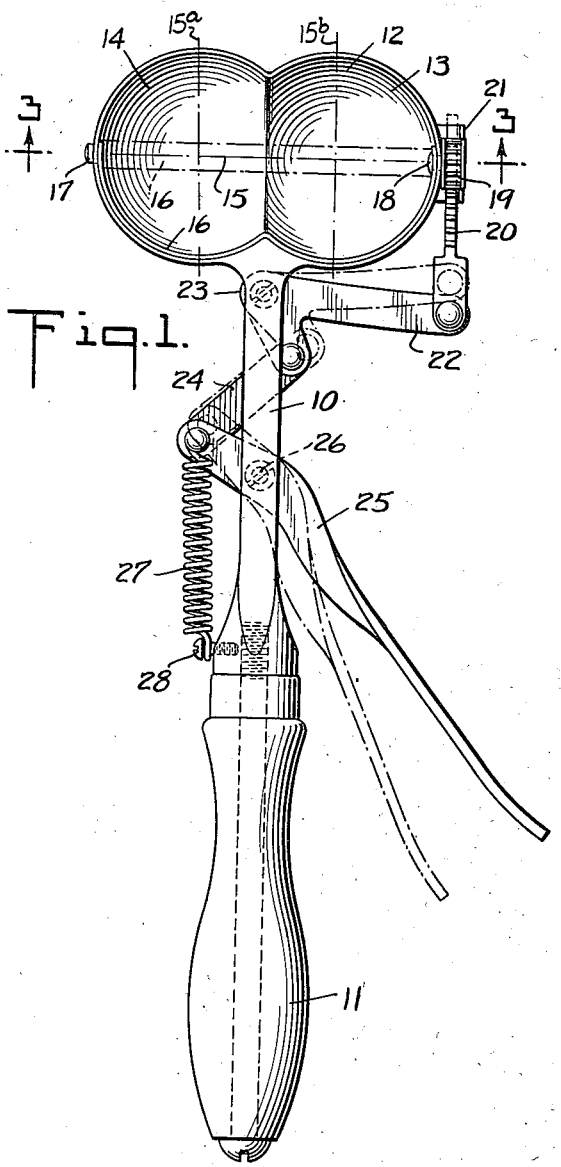
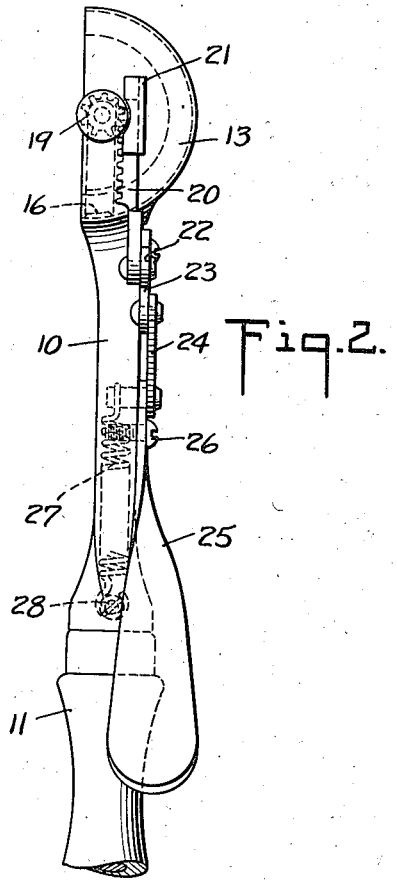
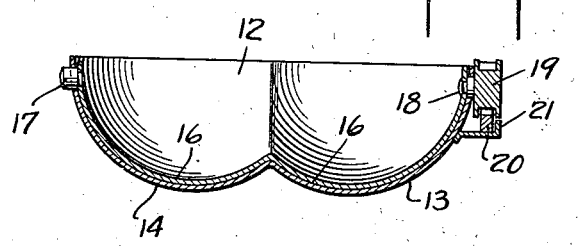
INVENTOR
Robert L. Pflieger
BY
Henry Savage
ATTORNEY Patented Mar. 17, 1936

2,034,117

UNITED STATES PATENT OFFICE 2,034,117

FOOD DISHER

Robert L. Pflieger, Dayton, Ohio

Application March 20, 1935, Serial No. 11,908

6 Claims. (Cl. 107—48)

My invention relates to dishers and particularly to a disher that is adapted to dish up a double service of ice cream, custard or other food at a single operation.

At the present time, there are on the market many ice cream cones and other cup pastry having double or elliptical tops that are designed to hold two balls or servings of ice cream or the like. When the dealer fills these double or elliptical cones, he does so with the ordinary ice cream disher, placing a ball or serving at one end of the mouth of the cone and then a second ball adjacent the first at the other end of the mouth of the cone. This necessitates two operations of the disher to fill each cone, and results in the frequent loss or falling off of the first serving while the scoop is being refilled. By means of my invention both balls or the entire serving of cream or other foods is dished up at the one time and placed on the cone or other place of service at a single operation. Thus there is no danger of losing the first ball and the two balls are secured together so that neither can fall off.

In the accompanying drawing, I have illustrated one form that my invention may take wherein, Fig. 1 is an elevation of my improved disher looking toward the open side of the bowl;

Fig. 2 is a side elevation thereof; and

Fig. 3 is a section through the bowl taken on the line 3—3 of Fig. 1.

The handle 10 has a hand grip 11 at one end, and at the opposite end there is mounted an elongated bowl 12 which may be formed from overlapping hemi-spherical sectors 13 and 14 having a common axis 15, which lies at right angles to the handle 10 and separate transverse axes 15a, 15b that lie parallel to the handle and are spaced apart a distance somewhat less than the diameter of the sectors so that the sectors overlap at the center. This overlapping of the sectors causes the two balls of cream to be joined together as a single unit or serving. Within the bowl is a scraper 16 which is pivotally mounted at 17 and 18 to rotate about the common axis of the two spherical sectors. At one end the scraper is secured to a pinion 19, which cooperates with a rack 20 slidably mounted in a guide 21, secured to one end of the bowl. The free end of the rack 20 is pivoted to the arm 22 of a bell crank lever 23 pivotally mounted on the handle 10. The short arm of the bell crank is connected by a link 24 to one end of an operating lever 25, that is pivotally mounted at 26 on the handle 10. A spring 27 is anchored at one end by a screw 28 and at its opposite end is connected to the operating lever 25 so as to exert a tension on this lever and normally hold it in its full line position as shown in Fig. 1. The pull of this spring keeps the rack 20 in its retracted position as shown in Figs. 1 and 2 so that the scraper 16 lies adjacent the lower top edge of the bowl. When the lever 25 is depressed toward the hand grip 11 to the dotted line position shown in Fig. 1, the scraper 16 will be rotated through about a quarter turn or to the position shown in dotted lines in Fig. 1.

In operation the merchant will hold the disher by the grip 11 and fill the bowl with ice cream or whatever food he desires to dispense. If he is filling ice cream cones with elongated or double tops, he will place the cream over the top of the cone and with his thumb press the lever 25 inwardly against the hand grip 11, which causes the scraper 15 to make one-half of a rotation within the bowl and free the cream at one operation. When the bowl is made from two overlapping hemi-spherical sectors as shown in the drawing, the serving of ice cream will have the appearance of two balls of cream joined along one side, but both of them will be placed on the top of the cone at one time so there is no danger of one of them falling off while the other one is being prepared for service.

While I have shown the bowl 12 as being formed from hemi-spherical sectors, it may, of course, be made of any shape desired such as a semi-cylindrical center section between the axes 15a, 15b and segmental or elliptical ends, or the bowl may consist of two conical sectors with the scrapers mounted to turn on vertical axes. It will also be understood that while I have shown a rack and pinion and a system of levers for actuating the scraper, many other mechanical movements may be used for that purpose. It will also be understood that the forms and mechanism which I have shown and described are but illustrative of one form that the invention may make and I claim all equivalents and modifications thereof that come within the scope of the following claims.

What I claim is:

1. In a disher, a handle, an elongated bowl formed from overlapping hemispherical sectors secured to the handle, a scraper pivoted in the bowl on an axis at right angles to the handle, an operating lever mounted on the handle, and means connecting the operating lever and scraper whereby operation of the lever will cause semi-rotation of said scraper within said bowl.

2. In a disher, a handle, an elongated bowl with its ends formed from hemi-spherical sectors secured to the handle with its long axis perpendicular to the handle, a scraper pivotally mounted in the bowl on the long axis thereof, an operating lever pivoted on said handle, a bell crank pivoted on said handle, one arm of said bell crank being operatively connected to rotate said scraper, and a link connecting the other arm of said bell crank to said operating lever.

3. In a disher, a handle, a bowl secured to said handle formed from two spherical sectors having a common axis and spaced apart transverse axes, a scraper in said bowl conforming to the curvature of said sectors and mounted to rotate about said common axis, an operating lever mounted on said handle, and connections between said handle and scraper to rotate said scraper on said axis.

4. In a disher, a handle, a double spherical sector bowl secured to said handle with their common axis perpendicular to the handle and their transverse axes spaced apart a distance less than the diameter of the sectors, a scraper conforming to the curvature of the bowl and pivoted at its two ends on said common axis, a pinion secured to one end of the scraper, a rack engaging said pinion, an operating lever mounted on said handle, and operative connections between said operating lever and rack to cause rotation of said pinion and scraper.

5. In a disher, a handle, an elongated bowl having spherical sector ends with the axis of the two ends lying lengthwise of the bowl and perpendicular to said handle, a scraper rotatably mounted in said bowl on said axis, a pinion fixed to one end of said scraper, a rack slidably mounted in a guide on said bowl and cooperating with said pinion, an operating lever mounted on said handle, a bell crank mounted on said handle, one arm of said bell crank being connected to said rack, and a link connecting the other arm of said bell crank to said operating lever.

6. In a disher, a handle, a bowl having two overlapping compartments secured to said handle, dislodging means for each compartment, and means mounted on said handle and connected to said dislodging means to actuate said dislodging means simultaneously to dislodge material from said compartments.

ROBERT L. PFLIEGER.